United States Patent [19]

Kaufman

[11] 4,090,874

[45] May 23, 1978

[54] METHOD FOR IMPROVING THE SINTERABILITY OF CRYOGENICALLY-PRODUCED IRON POWDER

[75] Inventor: Sydney M. Kaufman, Livonia, Mich.

[73] Assignee: Ford Motor Company, Dearborn, Mich.

[21] Appl. No.: 703,881

[22] Filed: Jul. 9, 1976

Related U.S. Application Data

[62] Division of Ser. No. 584,564, Jun. 6, 1975, abandoned.

[51] Int. Cl.² ............................ C22C 1/04; B22F 1/02
[52] U.S. Cl. ........................................ 75/246; 75/212; 75/213
[58] Field of Search ................... 29/182; 75/212, 213, 75/246

[56] References Cited

U.S. PATENT DOCUMENTS

| | | | |
|---|---|---|---|
| 2,289,897 | 7/1942 | Balk et al. | 29/182 |
| 2,301,805 | 11/1942 | Harder | 29/182 |
| 2,402,120 | 6/1946 | Boegeholn et al. | 29/182 |
| 2,853,767 | 9/1958 | Burkhammer | 29/182 |
| 3,307,924 | 3/1967 | Michael | 29/182 X |

FOREIGN PATENT DOCUMENTS 1,077,990 8/1967 United Kingdom ................... 75/212

Primary Examiner—Richard E. Schafer
Attorney, Agent, or Firm—Joseph W. Malleck; Olin B. Johnson

[57] ABSTRACT

A method is disclosed of making sintered parts with cryogenically-produced powder derived from scrap metal, such as machine turnings. The scrap metal is subjected to two impacting operations (such as by use of a ball milling machine). The first operation is carried out with the use of a refrigerating agent (to lower the temperature of the scrap metal below its ductile-brittle transition temperature) thereby resulting in comminution of the scrap to a cryogenic powder. The second impacting operation is carried out at ambient temperature conditions utilizing milling elements which impart cold work to at least a portion of the cryogenic powder; simultaneously, copper is mechanically transferred to substantially each particle of said cryogenic powder to form a continuous copper envelope thereabout. The coated cryogenic powder is then compacted and sintered; the sintered product may be subjected to hardening or tempering treatments if desired.

1 Claim, 3 Drawing Figures

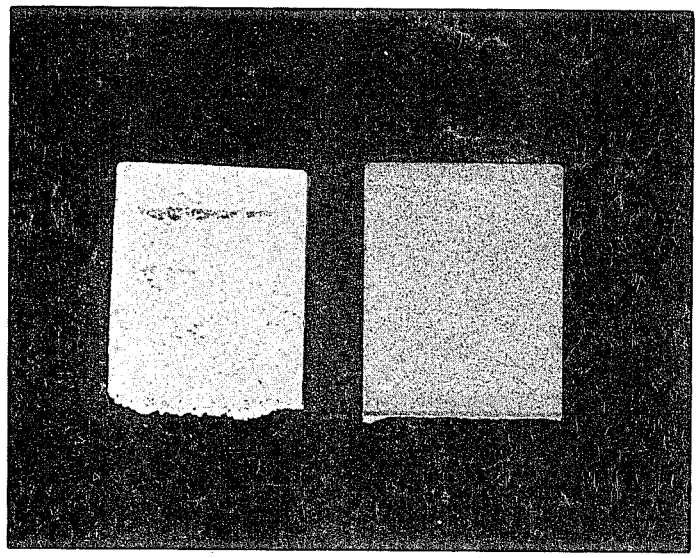
FIG. 2.
FIG. 3.
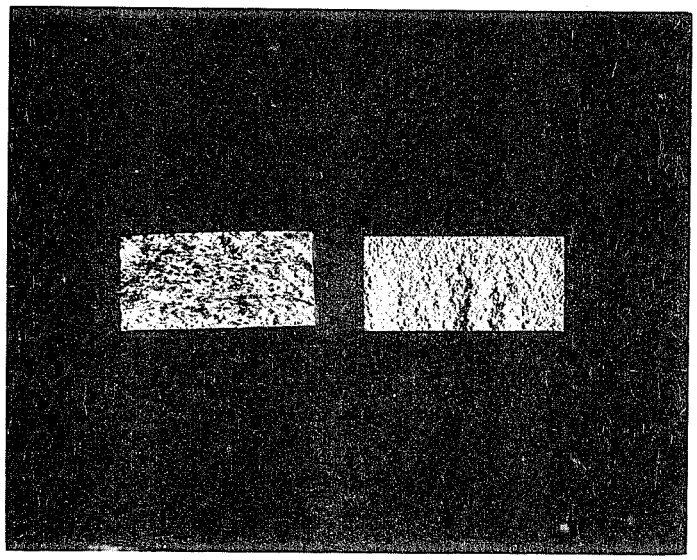

METHOD FOR IMPROVING THE SINTERABILITY OF CRYOGENICALLY-PRODUCED IRON POWDER

This is a division of application Ser. No. 584,564, filed June 6, 1975 now abandoned.

BACKGROUND OF THE INVENTION

Cryogenic powder making is a relatively new mode of providing a powdered raw material which can be put to use in powder metallurgy techniques and other applications. Cryogenic powder holds great promise because it can provide powdered material at a significantly lower cost and it may result in more useable physical properties, if not enhanced physical properties, for a sintered powdered part.

Essentially cryogenic powder making comprises subjecting scrap metal, or other solid starting metal material, to a temperature below the transition temperature of said metal, such as $-(30°-40)°$ F for ferrous based material. The metal becomes so brittle at such depressed temperatures that agitation within a conventional ball mill will reduce the scrap or starting metal material to a powder form over a predetermined period of time and stress from the ball milling elements. At the same time, any oil or other organic materials coating the scrap metal, particularly scrap metal in the form of machine turnings, will also freeze and be removed during the impaction by the ball milling elements; such frozen debris can be screened and separated.

To insure that the scrap metal is in the embrittled condition at the point of impaction, it is necessary to direct a supply of liquid nitrogen against the scrap metal immediately prior to introducing the scrap metal into the mill itself. The comminuted particles resulting from a predetermined amount of ball milling under such embrittled conditions, produces metal particle shapes which are flake-like or irregular, certainly not spherical. The layer-like or flake configuration results from the two facts: (a) the turning was originally ribbon-like, and (b) comminution takes place by fracture.

When such cryogenically produced powder is subjected to conventional powder metallurgy techniques, with a compacted quantity of such powder being heated to a sintering temperature, oxidation of ingredients such as manganese and silicon will typically take place prior to diffusion and completion of the sintering step. Such oxidation results because these elements require more sintering atmosphere control than is normally possible in current, more stringent operations.

SUMMARY OF THE INVENTION

A primary object of this invention is to provide a method of making sintered shapes, which method improves the diffusion kinetics for cryogenically produced powders utilized in such method. Other method objects of this invention comprise (a) a method of making an intermediate powder useful in powder metallurgy techniques, (b) an intermediate powder composition made from scrap machine turnings, and (c) a method of making a cold compacted shape which can be shipped as a commodity useful in subsequent sintering techniques to make a stable permanent metal part.

Another principal object of this invention is to upgrade the physical properties of cryogenic powder and in certain respects to surpass the physical properties of any carbon steel type powder irrespective of whether it is atomized or cryogenically produced.

Yet still another object of this invention is to produce a powder derived from a variety of scrap metal pieces traditionally not useable in scrap melting techniques, the powder so produced being completely substitutable for current commercially made metal powder.

Specific features pursuant to the above objects comprise: (a) continuously impacting the cryogenically produced powder to promote a thin copper shell about substantially each particle of said powder and to provide at least one defect site in each particle of said powder which is in excess of 124 microns, (b) coating and cold working said cryogenically produced powders in a manner to prevent oxidation of alloying ingredients, such as manganese and silicon, (c) imparting strain to a sufficient number of said cryogenically produced powder particles so as to improve atomic diffusion during sintering of said powder, and (d) significantly increasing shrinkage of said sintered powder as a result of improved diffusion kinetics.

SUMMARY OF THE DRAWINGS

FIG. 2 is a photograph of two sintered shapes, one comprised of cryogenically produced powder and the other comprising conventionally produced atomized ferrous based powder; and FIG. 3 is a photograph of the fracture surface along one end of each of the specimens illustrated in FIG. 1.

DETAILED DESCRIPTION

Figure 1:
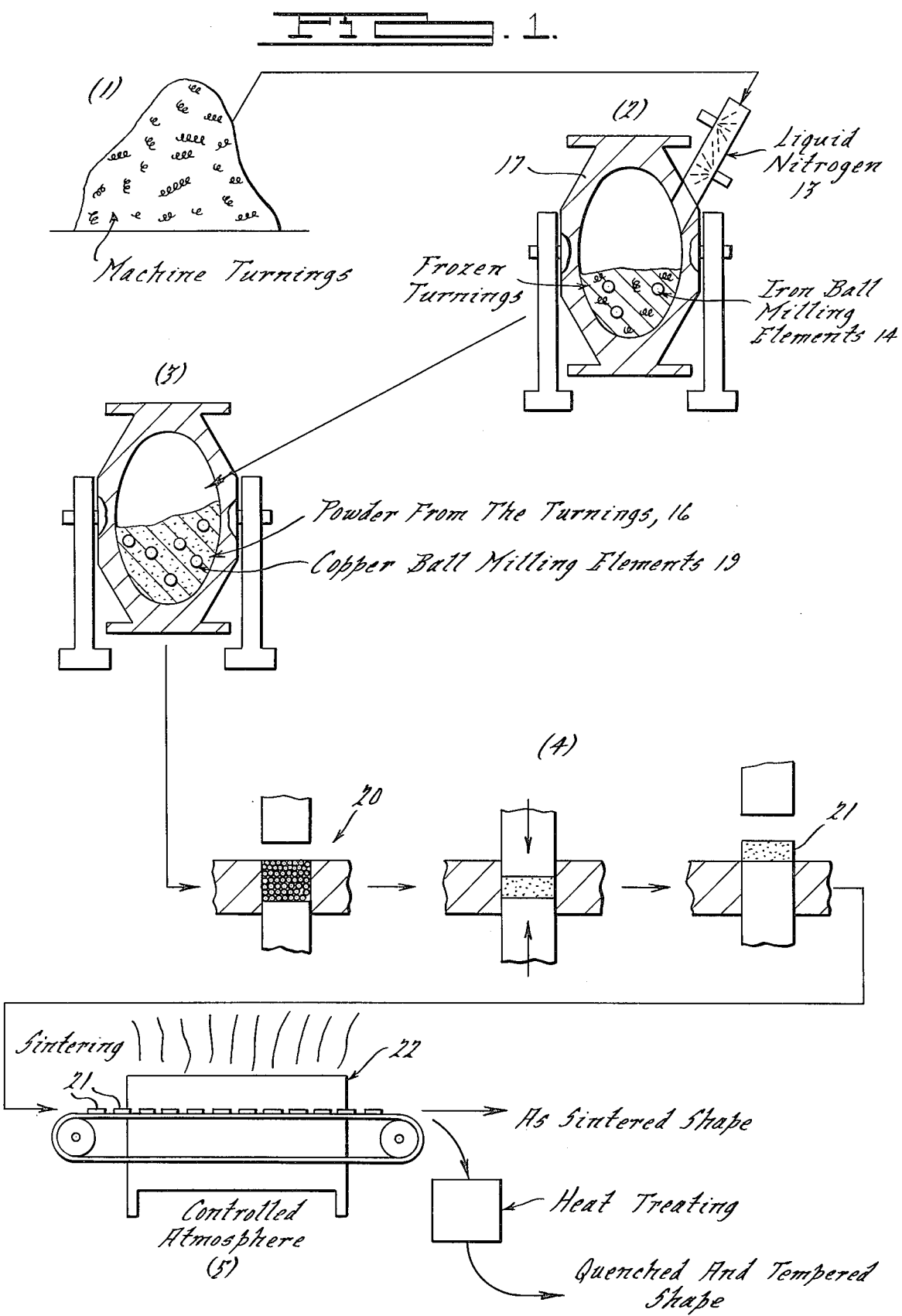
FIG. 1 is a schematic flow diagram of the comprehensive method of this invention.

A preferred mode for carrying out the method aspects of this invention is depicted in FIG. 1 and is as follows:

(1) Scrap metal and particularly machine turnings 10 are selected as the starting material. "Machine turnings" is defined herein to mean segments of ribbons of low alloy steel. They typically are shavings cut from alloy bar. But machine turnings, preferably ferrous based, include alloying ingredients such as manganese, silicon, chromium, nickel and molybdenum. The turnings should be selected to have a surface-to-volume ratio of at least 60:1, which is characteristic of machine turnings. The scrap pieces will have a size characterized by a width 0.1–1.0inches, thickness of 0.005–0.03inch, and a length of 1–100inches. Machine turnings are usually not suitable for melting in an electric furnace because they prevent efficient melt down due to such surface-to-volume ratio.

This process can be performed with other types or larger pieces of scrap metal, although capital investment costs may increase due to the difficulty of impacting scrap metal sized in particle pieces beyond 0.03inch thick. The scrap pieces should be selected to be generally compatible in chemistry when in the final product; this is achieved optimally when the scrap is selected from a common machining operation where the same metal stock was utilized in forming the turnings.

(2) The selected scrap pieces 10 are then put into a suitable charging passage 11 leading to a ball milling machine 12 or equivalent impacting device. Within the passage, means 13 for freezing such metal pieces is introduced, such as liquid nitrogen; it is sprayed directly onto the metal pieces. Mere contact of the liquid nitrogen with the scrap pieces will freeze them instantly. The application of the liquid nitrogen should be applied uniformly throughout its path to the point of impaction. The ball milling elements 14 are motivated preferably by rotation of the housing 17, to contact and impact the frozen pieces 15 of scrap metal causing them to fracture and be comminuted. Such impaction is carried out to apply sufficient fracturing force (defined to mean less than 1 ft.-lb.) and for sufficient period of time and rate to reduce said scrap pieces to a powder form. The powder 16 will typically have both a coarse and a fine powder proportion. Both proportions will be comprised of particles which are flake or layered in configuration; each particle will be highly irregular in shape and dimension, none being spherical in shape. A typical screen analysis for copper coated powder would be as follows (for a 100 gram sample):

| Mesh | No Milling (in grams) | After 72 Hrs. (in grams) |
|---|---|---|
| 60 | 60.0 | 31.5 |
| 100 | 19.5 | 11.0 |
| 140 | 5.5 | 7.5 |
| 200 | 6.5 | 18.0 |
| 325 | 4.5 | 22.5 |
| +325 | 4.0 | 9.5 |

(3) The comminuted cryogenic powder 16 is then subjected to another impacting step, but this time at ambient temperature conditions. The powder is placed preferably in another ball milling machine, the machine having copper laden elements 19 preferably in the form of solid copper balls of about 0.5 inch in diameter. In trials performed herein, the interior chamber was a 3 33 6 inches cylinder, powder charge was 10 in.$^3$, and the milling time was about 48 hours. Milling time and rate depend on mill volume, mill diameter size of copper balls, and the speed of rotation. The function of this second impacting step is to transfer, by impact, a portion of the copper ingredient carried by the ball milling elements 19 so as to form a copper shell about substantially each particle of the powder 16. The finer powder will obtain a copper coating by true abrasion or scratching with the surface of the ball milling elements 19. Ball milling elements 19 should have a diameter at least 50 times the largest dimension of any of the particle shapes of the cryogenic powder 16. Secondly, the ball milling operation must generate defect sites in substantially all powder particles above 124 microns; the ball milling operation herein should be carried out so that substantially each coarse particle has at least one defect site therein. This can be accomplished by rotating the housing 20 to impart a predetermined abrading force from the balls 19.

When this step is completed, the particles will be in a condition where they will all substantially have a continuous copper envelope (coating or shell) and be stressed sufficiently so as to have a high degree of cold work. The term "defect site" is defined herein to mean a defect in local atomic arrangement. The term "copper shell" is defined herein to mean a substantially continuous thin envelope intimately formed on the surface of the particle. Although the shell should preferably be an impervious continuous envelope about each particle, it is not critical that it be absolutely impervious. It has been shown, by the test examples performed in connection wih reducing this invention to practice, that cold working of the particles is predominantly influential in increasing diffusion kinetics of this invention, the copper coating or shell operating to predominantly form an anti-oxidation barrier.

(4) A predetermined quantity of powder condition from step (3) is compacted by a conventional press 20 to a predetermined density, preferably about 6.6 g./cc. This is brought about by the application of forces in the range of 30–35 tsi. The presence of the copper envelope about the powder particles improves compressibility. With prior uncoated powders, a density of about 6.4 g./cc. is typically obtained using a compressive force of 85,000 psi; with the powder herein, densities of about 6.6 g./cc. are now obtained at the same force level.

The shape 21 into which such powder is compacted is designed to have an outer configuration larger than that desired for the final part. A significant and highly improved shrinkage takes place as a result of the next step (5); the shrinkage can be a predetermined known factor and allowance can be made in the compacted shape 21 of this step. Shrinkage will be in the controlled limits of 15–15.

(5) The compacted shape 21 is subjected to a sintering treatment within a furnace 22 wherein it is heated to a temperature preferably in the range of 2000°–3100° F, for ferrous based cryogenic powder. The temperature to which the compact is heated should be at least the plastic region for the metal constituting the powder. A controlled or protective atmosphere is maintained in the furnace, preferably consisting of inert or reducing gases.

At the sintering temperatures, atomic diffusion takes place between particles of the powder particularly at solid contact points therebetween; certain atoms of one particle are supplied to fill the defect sites or absence of certain atoms in the crystal structure of the contacting particle, said defect sites being present as a result of cold working in step (3). Diffusion is accelerated to such an extent, that an increase of more than 100 times is obtained. It is theorized that at least 60% of the improvement in physical properties of the resulting sintered shape is due to the controlled cold working of the powder. The increased difffusion is responsible for the increase in shrinkage.

The copper envelope on the particles serves to essentially prevent oxidation of certain elements or ingredients within the powder particles, particularly manganese and silicon. With typical ball milling parameters, (such as physical size of mill speed change and ball size) sufficient to the job, it can be expected that substantially each particle of the cryogenic powder will possess an impervious copper shell. However, a totally impervious shell is not absolutely essential to obtaining an improvement of some of the properties herein.

As a basis for comparison, several as-sintered test samples were prepared. The procedure for preparing the test samples was varied to investigate aspects such as the effect of cold working, the influence of a copper coating without cold working, the manner in which the copper coating is applied, and the influence of particle size. All of the test samples were prepared according to the following fabrication and thermal treatment except as noted. A cryogenically produced powder quantity was admixed with 1% zinc stearate (useful as die wall lubricant) and 0.7–0.8% graphite. The admixture was compacted at a pressure of 25 tons/sq. in. into standard M.P.T.F. transverse rupture strength bars. The bars were preheated at 1450° F. for 20 minutes to burn off the lubricants, the heating was carried out in an endothermic type atmosphere at a 45° F dew point. Sintering was carried out at a higher temperature in the same endothermic atmosphere for an additional 20 minutes.

The first three samples are considered representative of the prior art as a reference base since no separate cold working or copper coating was employed.

| Sample No. | Sintering Temp. (° F) | Transverse Rupture Strength (psi) | Hardness ($R_B$) | As-Sintered Density |
|---|---|---|---|---|
| 1 | 2050 | 16,000 | 62 | 6.5 |
| 2 | 2075 | 20,000 | 68 | 6.6 |
| 3 | 2100 | 22,000 | 73 | 6.6 |

To investigate the effect of cold working, the powder ball milled was in a mill employing steel balls; the ball milling time was varied for each of the three samples in the following sequence: 20 hours, 44 hours and 96 hours.

| Sample No. | Sintering Temp. (° F) | Transverse Rupture Strength (psi) | Hardness ($R_B$) | As-Sintered Density |
|---|---|---|---|---|
| 4 | 2100 | 28,000 | — | 6.6 |
| 5 | 2100 | 46,000 | — | 6.6 |
| 6 | 2100 | 59,000 | — | 6.3 |

To further separate or analyze the effect of fine particle sizes, the starting material was not milled but rather it was screened so as to pass fine particles through a 100 mesh screen. The screened fine particles were then subjected to the treatment outlined above. The results showed:

| Sample No. | Sintering Temp. (° F) | Transverse Rupture Strength (psi) | Hardness ($R_B$) | As-Sintered Density |
|---|---|---|---|---|
| 7 | 2100 | 25,000 | 20–25 | 5.8 |

An investigation of the influence of copper coating, by itself, without cold working from ball milling elements, was pursued. A copper coating was applied chemically to the particles of the cryogenic powder; for the following first three samples, the coating was applied electrolytically using a copper sulphate ($CuSO_4$) salt in the electroplating bath and the next two samples were prepared utilizing a copper nitrate ($CuNo_3$) salt.

| Sample No. | Sintering Temp. (° F) | Transverse Rupture Strength (psi) | Hardness ($R_B$) | As-Sintered Density |
|---|---|---|---|---|
| 8 | 2100 | 3,000 | — | 5.5 (no special handling) |
| 9 | 2100 | 5,000 | — | 6.0 (the powder was pretreated in HCL before plating) |
| 10 | 2100 | 15,000 | — | 6.5 (an alcohol rinse was applied after plating) |
| 11 | 2100 | 18,000 | — | 6.5 (no special handling) |
| 12 | 2100 | 12,000 | — | 6.4 (an alcohol rinse was applied after plating) |

An investigation was made as to whether fine particles, simply copper coated, would provide an improvement. The copper coating was again applied electrolytically utilizing a copper nitrate ($CuNo_3$) salt, the powder particles were restricted to −100 mesh.

| Sample No. | Sintering Temp. (° F) | Transverse Rupture Strength (psi) | Hardness ($R_B$) | As-Sintered Density |
|---|---|---|---|---|
| 13 | 2100 | 72,000 | — | 6.2 |

Finally, the combined affect of (a) cold working through a ball milling operation and (b) the application of a copper envelope or coating on each of the particles at the same time the ball milling is carried out, was investigated. It is important to point out that the copper coating was applied mechanically by an abrading action between copper balls and the cryogenic powder within the milling machine. Fine particles below 120 mesh probably obtained a copper coating merely by abrading of the soft copper thereonto, while the coarser particle achieved a copper envelope much more by abrading action along with receiving cold work. The ball milling was carried out for a period of 96 hours. The results were as follows:

| Sample No. | Sintering Temp. (° F) | Transverse Rupture Strength (psi) | Hardness ($R_B$) | As-Sintered Density |
|---|---|---|---|---|
| 14 | 2100 | 90,000 | 84 | 6.7 |

By ball milling for extended periods of time or at an increased stress rate, a transverse rupture strength of at least 95,000 can be obtained. Accordingly, it is concluded that not only is the transverse rupture strength improved by the combination effect herein but such improvement is beyond that obtainable by utilizing conventional atomized powder under the same processing conditions but without cold work or copper coating. Typically, atomized powder will obtain at best a transverse rupture strength of 85,000 psi with a density of around 6.7 g./cc. when processed under the most favorable conditions known to the prior art. Accordingly, with the decrease in cost by use of scrap materials reduced to a powder cryogenically along with the improvement in physical characteristics herein, important advantages have been obtained.

Other conclusions which can be drawn form the above data include: (a) the general effect of cold working by ball milling increases the sinterability of the cryogenically produced powder, (b) decreasing the average particle size of the powder has little effect by itself on the final physical properties, (c) copper coating, by itself, appears only to improve sinterability of fine powders, and (d) the combination of cold working and copper coating by use of copper balls, increases the sintered strength 4–5 fold.

Turning now to FIGS. 2 and 3, there is illustrated comparative examples of an as-sintered shape. The sample in the left hand portion of FIGS. 2 and 3 represents a shape produced in accordance with this invention utilizing cryogenically produced powder and processed with a second ball milling operation where cold working and copper coating is obtained. The sample in the right hand portion in each of the photographs represents an as-sintered shape obtained by conventional powder metallurgy techniques utilizing ordinary atomized iron powder. Such ordinary atomized powder typically consists of primarily 99.1% iron, the remainder may consist of: carbon 0.01–0.045%; silicon 0.005–0.015%; sulphur 0.004–0.016; phosphorous 0.007–0.027; Mn 0.04–0.26%; residual oxides — weight loss in $H_2$ is 0.2–0.6%. The atomized powder was merely subjected to a compacting step achieving a green density of about 6.4, and was subjected to heating at a sintering temperature of 2050° F.

In FIG. 2, the right-hand sample of this invention has a particularly evident smooth outer surface as opposed to the relative rough heterogeneously shaded outer surface for the sample on the left. FIG. 3 shows the end face where fracture took place as a result of destructive testing. The sample on the left has a typical fracture, rough and highly porous surface. The sample on the right has a fibrous appearance. The as-sintered shape of this invention is particularly comprised of ferrous particles which are randomly irregular in configuration, none of which are spherical; the particles are bound together by molecular diffusion at contact points therebetween, said shape having no apparent porosity and has a fractured surface as a result of destructive testing which appears as glassy. It is further characterized by a weight to volume ratio of 6.6–6.7, a typical transverse rupture strength of 95,000 psi with the compact at a density of 6.6–6.7 g./cc. (resulting from compression forces of 25–30 tsi). The hardness of such as-sintered shape is at least 84 $R_B$.

A new powder compact has been achieved as a result of practicing a portion of the disclosure herein. Such powder compact uniquely consists essentially of uniformly and homogeneously mixed ferrous based particles having a porportion of fine particles in the size range of −200+325 and a coarse particle proportion in the size range of −60+140, the fine particles being present in the ratio of 1:1 to the coarse particles, the fine and coarse particles each have a copper envelope about substantially each of the coarse particles thereof, and substantially each of the coarse particles have at least one defect site therein, said compact having a density of at least 6.6 g./cc. and a volume shrinkage of about 10% upon being heated to 2050° F.

I claim as my invention:

1. A powder compact consisting essentially of a uniform and homogeneous mixture of ferrous-based first particles having a size range −200+325 mesh and containing oxidizable alloying ingredients including carbon, manganese and chromium and ferrous-based second particles having a size range of −60+140 mesh, one of said first and second particles having a copper envelope about substantially each of the particles thereof, and substantially each of the particles of said first particles having at least one impact stress defect site therein, said compact having a density of between 6.6–6.7 g./cc. and a volume shrinkage of 7–10% upon being heated to 2050° F.

* * * * *